United States Patent
Lof

(10) Patent No.: US 10,118,286 B2
(45) Date of Patent: Nov. 6, 2018

(54) LIFTING DEVICE FOR USE AT A MANUAL WORK STATION

(71) Applicant: LOFS SPECIALMASKINER AB, Tibro (SE)

(72) Inventor: Klas-Arne Lof, Skovde (SE)

(73) Assignee: LOFS SPECIALMASKINER AB, Tibro (SE)

( * ) Notice: Subject to any disclaimer, the term of this patent is extended or adjusted under 35 U.S.C. 154(b) by 158 days.

(21) Appl. No.: 14/914,765

(22) PCT Filed: Aug. 26, 2014

(86) PCT No.: PCT/SE2014/050974
§ 371 (c)(1),
(2) Date: Feb. 26, 2016

(87) PCT Pub. No.: WO2015/030658
PCT Pub. Date: Mar. 5, 2015

(65) Prior Publication Data
US 2016/0207191 A1 Jul. 21, 2016

(30) Foreign Application Priority Data
Aug. 28, 2013 (SE) ...................................... 1330102

(51) Int. Cl.
*F16M 11/00* (2006.01)
*B25H 1/00* (2006.01)
*B25J 1/12* (2006.01)

(52) U.S. Cl.
CPC .............. *B25H 1/0028* (2013.01); *B25J 1/12* (2013.01)

(58) Field of Classification Search
USPC ....... 248/685, 686, 550, 648, 651, 660, 663, 248/666, 667, 676, 123.11, 125.7, 125.8,
(Continued)

(56) References Cited

U.S. PATENT DOCUMENTS 916,286 A * 3/1909 Evans .................... F16M 11/14
248/181.1
1,833,781 A * 11/1931 Fuller ..................... E21C 11/00
248/404

(Continued)

FOREIGN PATENT DOCUMENTS

CN 201511364 U 6/2010
DE 1 96 19 880 A1 11/1997
(Continued)

OTHER PUBLICATIONS

International Search Report, dated Dec. 5, 2014, from corresponding PCT application.

*Primary Examiner* — Terrell L McKinnon
*Assistant Examiner* — Michael McDuffie
(74) *Attorney, Agent, or Firm* — Young & Thompson

(57) ABSTRACT

A lifting device includes a framework (2) and a manipulator arm (8) pivotally connected to the framework. The manipulator arm includes a first end portion (19) and a second end portion (13) adapted to carry a tool (20). A balancing arrangement (7; 30, 39) includes a first part (7a; 30a; 39a) connected to the framework and a second part (7b; 30b; 39b) adapted to interact with the first end portion. At least one of the manipulator arm and the balancing arrangement includes a first balancing device (11; 31; 34), which is extendable to ensure that interaction between the second part and the first end portion is maintained. The first balancing device is adapted to generate a first balancing force which maintains a moment balance about the first joint. The manipulator arm has at least two rotational degrees of freedom in a first spherical coordinate system (17).

18 Claims, 5 Drawing Sheets

(58) Field of Classification Search
USPC .............. 248/162.1, 404, 422, 181.1, 288.11,
248/288.31, 354.6, 364; 414/719
See application file for complete search history.

(56) References Cited

U.S. PATENT DOCUMENTS

| | | | | |
|---|---|---|---|---|
| 2,790,119 A * | 4/1957 | Konet | ................ | F41G 5/16 |
| | | | | 248/371 |
| 2,950,836 A * | 8/1960 | Murdock | ............ | A24F 19/0092 |
| | | | | 131/241 |
| 3,345,021 A * | 10/1967 | Gransten | ................ | B25F 5/021 |
| | | | | 173/36 |
| 3,908,944 A * | 9/1975 | Bjork | ................ | A47B 27/16 |
| | | | | 248/162.1 |
| 4,515,336 A * | 5/1985 | Fischer | ............... | F16C 11/0619 |
| | | | | 248/288.51 |
| 4,723,460 A * | 2/1988 | Rosheim | ............. | B25J 17/0275 |
| | | | | 403/58 |
| 4,969,625 A | 11/1990 | Singer et al. | | |
| 5,243,873 A * | 9/1993 | Demers | ................ | B25J 17/0275 |
| | | | | 74/490.06 |
| 6,095,476 A * | 8/2000 | Mathis | ................... | F16M 11/10 |
| | | | | 108/7 |
| 6,220,556 B1 * | 4/2001 | Sohrt | ................... | F16C 11/106 |
| | | | | 248/278.1 |
| 7,467,775 B2 * | 12/2008 | Lu | ......................... | F16M 11/14 |
| | | | | 248/288.51 |
| 7,669,341 B1 * | 3/2010 | Carazo | ................... | G01C 15/02 |
| | | | | 248/288.31 |
| 8,286,927 B2 * | 10/2012 | Sweere | ............. | A47B 21/0073 |
| | | | | 108/147 |
| 8,366,064 B2 * | 2/2013 | Chen | ................... | F16M 11/043 |
| | | | | 224/416 |
| 8,511,625 B2 * | 8/2013 | Stefan | ............... | A61B 1/00149 |
| | | | | 248/181.1 |
| 8,876,077 B2 * | 11/2014 | Maillard | ................ | F16M 11/12 |
| | | | | 248/274.1 |
| 2007/0145204 A1 * | 6/2007 | Miyasaki | ........... | F16M 11/2021 |
| | | | | 248/162.1 |
| 2010/0207351 A1 * | 8/2010 | Klieber | .................. | B62K 19/36 |
| | | | | 280/278 |

FOREIGN PATENT DOCUMENTS

| | | |
|---|---|---|
| DE | 10 2008 013244 A1 | 9/2009 |
| DE | 20 2009 012493 U1 | 1/2010 |
| EP | 0 733 579 A1 | 9/1996 |

* cited by examiner

LIFTING DEVICE FOR USE AT A MANUAL WORK STATION

SUBJECT OF THE INVENTION

The invention relates to a lifting device for use at a manual work station. The lifting device comprises a framework and an elongate manipulator arm pivotally connected to the framework by a first joint. The elongate manipulator arm comprises a first end portion and a second end portion located on opposite sides of the first joint as seen in the longitudinal direction of the manipulator arm, wherein the second end portion is adapted to carry at least one tool. The lifting device further comprises a balancing arrangement comprising a first part connected to the framework and a second part adapted to interact with the first end portion of the manipulator arm. At least one of the manipulator arm and the balancing arrangement comprises a first balancing device. The first balancing device is extendable to ensure that the interaction between the second part of the balancing arrangement and the first end portion of the manipulator arm is maintained when the manipulator arm is rotated about the first joint. The first balancing device is also adapted to generate a first balancing force which, through the interaction between the first end portion of the manipulator arm and the second part of the balancing arrangement, maintains a moment balance about the first joint with respect to the gravitational force acting on the manipulator arm.

BACKGROUND OF THE INVENTION

A manual work station is a station at which an operator performs a manual task such as attaching one part to another or simply moving an object from one position to another. Operators working at such manual work stations often use tools such as electric moment of force wrenches and screw drivers. Some of these tools are heavy to operate and operators of such tools are often subject to fatigue and stress injuries.

One solution to this problem is to use a balanced lifting device comprising a manipulator arm. The tool is attached to an outermost end of the manipulator arm, which consists of a plurality of pivotally connected arm segments. The pivotally connected arm segments allow the operator to move the tool within a work space. A balancing device is acting on the manipulator arm to compensate for the gravitational force acting on the manipulator arm. This arrangement reduces the effort required to move and use the tool.

A lifting device for use at a work station and provided with a balancing device is revealed in CN 201511364U. This document describes a pneumatic balance assisted manipulator for lifting and positioning a car seat. The balance assisted manipulator is provided with a pneumatic control system mounted on a rotary vertical post. A manipulator arm comprising a plurality of pivotally connected arm segments and cooperating with the pneumatic control system is also mounted on the post. The pneumatic control system balances the force generated by the compressed air and the gravitational force acting on the car seat.

This lifting device is inefficient, has a complex design and occupies a large part of the work space.

OBJECT OF THE INVENTION

The object of the invention is to provide a compact and easy to handle lifting device adapted to carry a tool for use at a manual work station.

SHORT DESCRIPTION OF THE INVENTION

The following definitions apply in this specification.

A lifting device according to the invention is a device adapted to carry a tool suitable for use at a manual work station. A manual work station is a work station at which an operator performs manual work. The manual work station can be a part of an assembly line. An operator performing manual work at the work station may use a tool attached to the lifting device. The tool may be any kind of tool suitable for use at a manual work station, such as an electric moment of force wrench or a screw driver. The tool may also be adapted to facilitate movement of an object from one position to another.

The term "connected to" as used herein does not necessarily mean "directly connected to". Connected pieces may be connected via one or more intermediate pieces.

A force "applied to" a piece does not have to be directly applied to that piece. The force can be applied to said piece via another piece.

A force "acting on" a piece does not have to act directly on that piece. The force can act on said piece via another piece.

A manipulator arm is defined as an elongate structure which is pivotally connected to a framework and is adapted to carry one or more tools, which tools are removably or permanently attached to the manipulator arm. A manipulator arm may comprise one or more members.

The term "moment balance" refers to a state wherein a piece connected to another piece by a joint does not rotate about the joint. The term "moment balance with respect to a first force" refers to a state wherein the first force is countered by a second force, so that the first force alone cannot cause the piece to rotate about the joint.

The object of the invention is achieved with a lifting device according to the invention.

The lifting device according to the invention is adapted for use at a manual work station and comprises a framework and an elongate manipulator arm pivotally connected to the framework by a first joint. The elongate manipulator arm comprises a first end portion and a second end portion located on opposite sides of the first joint as seen in the longitudinal direction of the manipulator arm. The second end portion is adapted to carry at least one tool. The lifting device further comprises a balancing arrangement, which comprises a first part connected to the framework and a second part adapted to interact with the first end portion of the manipulator arm. At least one of the manipulator arm and the balancing arrangement comprises a first balancing device, which first balancing device is extendable to ensure that the interaction between the second part of the balancing arrangement and the first end portion of the manipulator arm is maintained when the manipulator arm is rotated about the first joint. The first balancing device is adapted to generate a first balancing force which, through the interaction between the first end portion of the manipulator arm and the second part of the balancing arrangement, maintains a moment balance about the first joint with respect to the gravitational force acting on the manipulator arm. The manipulator arm has at least two rotational degrees of freedom at the first joint in a first spherical coordinate system which has a centre point that coincides with the rotational centre of the first joint.

The manipulator arm is pivotally connected to the framework so that it may be rotated in any direction about the first joint. This makes it easy for an operator to manoeuvre the tool within a workspace.

During operation of the lifting device, when the manipulator arm is rotated about the first joint, the gravitational force acts on the manipulator arm to return the manipulator arm to a state of equilibrium with respect to the gravitational force. The moment about the first joint generated by the gravitational force that acts on the manipulator arm is hereinafter referred to as the gravitational moment (the gravitational force that acts on the manipulator arm is defined as the sum of the gravitational forces acting directly on the manipulator arm, the tool and any object carried by the tool).

The gravitational moment is countered by a balancing moment that acts to rotate the manipulator arm about the first joint in the opposite direction. The balancing moment is generated by the first balancing device through interaction between the second part of the balancing arrangement and the first end portion. The first balancing device generates a first balancing force. The first balancing force can be applied to the first end portion of the manipulator arm, which may be the case when the first balancing device is part of the balancing arrangement, or interact with the balancing arrangement to generate a reaction force that acts on the first end portion of the manipulator arm, which may be the case when the first balancing device is part of the manipulator arm. The force acting on the first end portion of the manipulator arm to counter the gravitational moment is referred to as the opposing force.

The magnitude of the gravitational moment depends on the length of the lever arm of the gravitational force and thus at least partially on the angular position of the manipulator arm at the first joint. The magnitude of the balancing moment depends on the length of the lever arm of the opposing force and thus at least partially on the angular position of the manipulator arm. Rotation of the manipulator arm about the first joint will increase or decrease the gravitational moment and the balancing moment with about the same amount. Thus, the lifting device according to the invention reduces the effort required by the operator to rotate the manipulator arm about the first joint and ensures that the manipulator arm remains in its current position when the operator lets go of the tool.

Note that the magnitude of the balancing moment and the magnitude of the gravitational moment do not have to be exactly the same. Friction between components of the lifting device may compensate for minor differences in magnitude.

The flexible design makes it possible to achieve the required degree of flexibility with relatively few components and allows for a more compact construction. Most importantly, the above described construction ensures that the gravitational moment is automatically countered by a balancing moment.

The first balancing force may be adapted to maintain the moment balance about the first joint regardless of the angular position of manipulator arm at the first joint. However, it is usually sufficient to ensure that the moment balance about the first joint is maintained as long as the manipulator arm remains within an angle of 22°, or advantageously within an angle of 45°, with respect to a vertical axis extending through the first joint. At least one of the balancing arrangement and the manipulator arm comprises a first balancing device. The first balancing device has a variable length to ensure that the interaction between the second part of the balancing arrangement and the first end portion of the manipulator arm is maintained when the manipulator arm is rotated about the first joint. The extendable first balancing device may, for example, be adapted to act on the second part of the balancing arrangement, which second part of the balancing arrangement is movable with respect to the first part of the balancing arrangement. The first balancing force forces the second part of the balancing arrangement in a direction towards the first end portion of the manipulator arm, so that the interaction between the second part of the balancing arrangement and the first end portion is maintained when the manipulator arm is rotated about the first joint. In some embodiments, the extendable first balancing device is part of the manipulator arm. The first balancing force forces the first end portion in a direction towards the second part of the balancing arrangement, so that interaction between the second part of the balancing arrangement and the first end portion of the manipulator arm is maintained when the manipulator arm is rotated about the first joint. It is, of course, possible to arrange balancing devices in both the balancing arrangement and the manipulator arm.

In some embodiments, the second part of the balancing arrangement may comprise a surface adapted to interact with the first end portion of the manipulator arm, which first surface has an extension in a horizontal plane when the lifting device is in use. In these embodiments, the extendable first balancing device is adapted to ensure that the interaction between the first end portion and the first surface is maintained when the manipulator arm is rotated about the first joint and the first end portion is moved in relation to the surface. These embodiments are advantageous in that they comprise few components, are easy to manufacture and take up little space. In some of these embodiments, the extendable first balancing device may be part of the manipulator arm, so that the length of the manipulator arm is adjusted as the manipulator arm is rotated about the first joint. In these embodiments, the first balancing device applies a first balancing force to the surface of the second part of the balancing arrangement, thus generating a reaction force (the opposing force) which acts on the first end portion of the manipulator arm to counter the gravitational moment. Alternatively, the first balancing device may be part of the balancing arrangement, in which case the first balancing device may be adapted to move the surface of the second part of the balancing arrangement in a direction towards the first end portion of the balancing device as the manipulator arm is rotated about the first joint. In this embodiment, the first balancing device applies the first balancing force (the opposing force) to the first end portion of the manipulator arm through the interaction between the second part of the balancing arrangement and the first end portion of the manipulator arm. As above, both the manipulator arm and the balancing arrangement may comprise a balancing device.

The surface of the second part of the balancing arrangement faces the first end portion of the manipulator arm. Preferably, the surface has an extension such that the interaction between the first end portion and the surface is maintained at least as long as the manipulator arm remains within an angle of 22°, or advantageously within an angle of 45°, with respect to a vertical axis extending through the first joint.

The outer perimeter of the surface may be provided with a protruding edge that prevents the first end portion of the manipulator arm from disengaging with the balancing arrangement.

The second part of the balancing arrangement may comprise a movable disc having a flat surface facing the first end portion of the manipulator arm.

The disc may be connected to the first balancing device when the first balancing device is incorporated in the second part of the balancing arrangement. The first balancing device may, for example, be a pneumatic or hydraulic cylinder, an electric device or a spring. The disc may, for example, be connected to a piston in the pneumatic or hydraulic cylinder.

The balancing arrangement comprises the first and second parts. The first and second parts may have elongate shapes. The first and second parts may be connected by intermediate parts.

The first and second parts may be fixedly connected to one another, that is, the first and second parts may form a single piece.

The second part may be displaceable relative the first part in the longitudinal direction of the first part.

The second part may be pivotally connected to the first part.

In some embodiments, the second part of the balancing arrangement is pivotally connected to the first end portion of the manipulator arm by a second joint and pivotally connected to the framework by a third joint.

In a particularly advantageous embodiment, the third joint connects the framework and the first part of the balancing arrangement. The second part of the balancing arrangement may be either fixedly connected to the first part of the balancing arrangement or displaceable in the longitudinal direction of the first part of the balancing arrangement. That is, both the first and the second parts of the balancing arrangement are pivotable with respect to the framework. The first balancing device may, for example, be located between the second and third joints or between the first and second joints. In this embodiment, the second joint has at least two rotational degrees of freedom in a second spherical coordinate system with a centre point that coincides with the rotational centre of the second joint and the third joint has at least two rotational degrees of freedom in a third spherical coordinate system with a centre point that coincides with the rotational centre of the third joint. That is, the second joint, which is located in a space between the first and third joints, is movable in relation to the first and third joints, so that the manipulator arm is allowed to rotate in any direction about the first joint.

In a particularly advantageous embodiment, the second joint is movable within a curved surface with the shape of a spherical surface segment with a centre at the first or the third joint. This is the case, for example, when only one of the manipulator arm and the balancing arrangement comprises a first balancing device.

Advantageously, the first and third joints are positionally fixed in relation to one another. Alternatively, the first and third joints may be allowed to move somewhat in relation to one another.

These embodiments are advantageous in that they automatically compensate for the gravitational force, comprise few components and take up little space.

Alternatively, the first part of the balancing arrangement is fixedly connected to the framework and the third joint connects the first and second parts of the balancing arrangement. In this embodiment, the first part of the balancing arrangement comprises the first balancing device. The arrangement of the first balancing device between the third joint and the framework ensures that the third joint is movable in the longitudinal direction of the first part of the balancing arrangement. In this embodiment, the second joint provides at least two rotational degrees of freedom in a second spherical coordinate system with a centre point that coincides with the rotational centre of the second joint and the third joint provides at least two rotational degrees of freedom in a third spherical coordinate system with a centre point that coincides with the rotational centre of the third joint.

The first joint provides the manipulator arm with at least two rotational degrees of freedom in the first spherical coordinate system, which has a centre point that coincides with the rotational centre of the first joint. The first joint may, for example, be a ball joint.

The second joint provides the manipulator arm and the second part of the balancing arrangement with at least two rotational degrees of freedom in the second spherical coordinate system, which has a centre point that coincides with the rotational centre of the second joint. The second joint may, for example, be a ball joint.

The third joint provides at least the second part of the balancing arrangement with at least two rotational degrees of freedom in the third spherical coordinate system, which has a centre point that coincides with the rotational centre of the third joint. The third joint may, for example, be a ball joint.

Another type of joint that provides two rotational degrees of freedom is described below. This joint comprises an outer frame that is pivotally connected to the framework and is allowed to rotate about a first axis that extends through the rotational centre of the joint. The first axis may extend at an angle to a vertical axis extending through the rotational centre of the first joint. An elongate element, for example the manipulator arm, is connected to the outer frame, so that the elongate element rotates with the outer frame about the first axis. The elongate element is pivotally connected to the outer frame, so that the element is allowed to rotate about a second axis that extends at a right angle to the first axis. The first and second axes intersect at the rotational centre of the joint. The second axis rotates with the first axis about the rotational centre of the joint. The elongate element may, for example, be rotatably mounted on a transverse axle extending from one side of the outer frame to the other. The skilled person understands that this design can be modified in a plurality of ways. For example, the elongate element can be fixedly attached to the transverse axle, which is rotatably connected to the outer frame. This embodiment is particularly suitable for use as the first joint or the third joint.

Advantageously, the first balancing force is applied in a longitudinal direction of either the manipulator arm or the balancing arrangement.

Advantageously, the first balancing device is arranged so that the first balancing force is applied along a vertical axis that extends through the first joint when the lifting device is mounted and the gravitational moment is zero. For example, in an embodiment comprising a first, second and third joint, this can be achieved by ensuring that the first and third joints are located on the same vertical axis (when the lifting device is in use).

Advantageously, the framework comprises a fastening part adapted to be attached to an external structure, for example a horizontal beam, a post or a floor. The framework can be fixedly or removably attached to the external structure. Advantageously, both the lifting device and the external structure are located at a distance from the work floor, so that they do not occupy valuable workspace.

Advantageously, the lifting device comprises at least one manipulator arm position sensor adapted to continuously measure at least one manipulator arm position parameter indicative of the angular position of the manipulator arm at the first joint. Examples of suitable manipulator arm position parameters are the angular position and the angular displacement of the manipulator arm at the first joint. Other suitable manipulator arm position parameters is the distance between the outermost end of the first end portion of the manipulator arm and the rotational centre of the first joint (when the first balancing device is part of the manipulator arm) and the distance between the outermost end of the first end portion of the manipulator arm and the rotational centre of the third joint (when the first balancing device is part of the balancing arrangement). Suitable manipulator arm position sensors are rotary encoders, linear sensors, inclinometers, resistance sensors and sensors adapted for distance measurement with light. A lifting device may, for example, comprise two manipulator arm position sensors adapted to measure the colatitude and azimuth angle of the manipulator arm in the first spherical coordinate system. These manipulator arm position sensors may be located at the first joint.

The manipulator arm may comprise a first member comprising the first end portion and a second member comprising the second end portion. Both the first and second members may have an elongate shape. The second member may be displaceable relative the first member in the longitudinal direction of the manipulator arm. This allows an operator to move the tool in any direction and to position it anywhere within a three-dimensional work space.

The lifting device may comprise at least one second member position sensor adapted to continuously measure at least one second member position parameter indicative of the position of the second member with respect to the first member. The second member position sensor may be, for example, a rotary encoder, linear sensor or any sensor adapted to measure distances with light. A second member position sensor in the form of a rotary encoder may be arranged as described below. A toothed wheel is fixed to a shaft which is rotatably connected to the second member. The toothed wheel extends through a slot in the second member so that it may interact with a toothed track on the first member. The toothed track runs in the longitudinal direction of the first member, so that the toothed wheel and the shaft are rotated when the second member is displaced in relation to the first member. The angular displacement of the shaft is measured by means of the rotary encoder and the information collected by the rotary encoder can be used to determine the position or displacement of the second member with respect to the first member.

The first balancing device may be adapted to adjust the magnitude of the first balancing force in response to parameter data received from at least one of the manipulator arm position and second member position sensors. Continuous adjustment of the magnitude of the first balancing force in response to parameter data received from at least one manipulator arm position sensor ensures that the moment balance about the first joint is maintained when the manipulator arm is rotated about the first joint. Continuous adjustment of the first balancing force in response to parameter data received from at least on second member position sensor ensures that the moment balance about the first joint is maintained when the second member is moved in the longitudinal direction of the manipulator arm.

Advantageously, a second balancing device is connected to the first and second members of the manipulator arm. The second balancing device is adapted to exert a second balancing force on the second member in the longitudinal direction of the first member. The second balancing force balances the gravitational pull on the second member in the longitudinal direction of the manipulator arm. The second balancing device, too, may adapted to adjust the second balancing force in response to parameter data received from at least one manipulator arm position sensor, seeing that the gravitational pull on the second member in the longitudinal direction of the first member is dependent on the angular position of the manipulator arm at the first joint. Such balancing devices are well known in the art. The skilled person understands that the second balancing device can be any type of suitable balancing device. The second balancing device may, for example, comprise an electric device, a spring or a single acting pneumatic or hydraulic cylinder.

The lifting device may comprise a data storage means adapted to store information received from at least one manipulator arm position sensor and/or at least one second member position sensor. The information stored in the data storage means can be retrieved during a later stage, for example to evaluate an assembly process. It may, for example, be of interest to know the torque(s) that was applied to a screw located at a specific position.

The data storage means may also comprise information that can be used to control the tool connected to the manipulator arm. Such information may relate to the positions of a plurality of screws and the order in which they should be fastened. The tool is may be adapted to remain inactive until it is brought to the correct position. The torque(s) to be applied to each screw can also be predetermined. The data storage means may communicate with external systems and tools.

The lifting device according to the invention may comprise a control unit adapted to control at least the first balancing device. The control unit is adapted to communicate with at least one manipulator arm position sensor and/or at least one second member position sensor. The control unit may be adapted to adjust the magnitude of the first balancing force in response to parameter data continuously received from at least one of said sensors. The magnitude of the balancing force is advantageously adjusted as quickly as possible following a repositioning of the tool. The control unit can also be adapted to control the second balancing device, or a separate control unit can be adapted to control the second balancing device.

Alternatively, the first balancing device may be adapted to apply a constant first balancing force to the manipulator arm. That is, the magnitude of the first balancing force remains constant regardless of the angular position of the manipulator arm. This solution allows for a more compact lifting device which is easy to handle. The manufacturing costs can be reduced. A constant first balancing force is often sufficient to maintain the moment balance about the first joint, because friction between components compensates for minor differences between the magnitude of the gravitational moment and the magnitude of the balancing moment.

The magnitude of the constant first balancing force is determined beforehand in dependence on number of variables, such as the weight of the manipulator arm, the weight of the tool and the position of the first joint along the longitudinal axis of the manipulator arm.

The control unit and the data storage means are, advantageously, adapted to communicate with one another. The data storage means may, for example, store information received form the control unit.

The control unit may comprise one or more subunits. At least one of these subunits may be adapted to control the tool based on information received from the data storage means. Alternatively, the tool is controlled by an external control unit (which may communicate with the data storage means).

The control unit and the data storage means may be part of a single unit.

The first balancing device may comprise a cylinder body and a piston rod slidably mounted in the cylinder body, wherein the first balancing device further comprises at least one first pressure regulator adapted to control the pressure in a fluid located within the cylinder body and acting on the piston rod to generate the first balancing force. The first balancing device may be a pneumatic or hydraulic cylinder. The fluid may be a gas or a liquid.

The first part of the balancing arrangement may comprise one or both of the cylinder body and the piston rod. The second part of the balancing arrangement may comprise one or both of the cylinder body and the piston rod. In a particular advantageous embodiment, the first part comprises one of the cylinder body and the piston rod and the other part comprises the other one of the cylinder body and the piston rod.

The first pressure regulator may be adapted to maintain a constant pressure in the cylinder body. Alternatively, the control unit may be adapted to control the first pressure regulator to allow adjustment of the pressure in the cylinder body and thus the magnitude of the first balancing force.

In alternative embodiments, the first balancing device may comprise a spring, e.g. a coil spring or a constant force spring. In other embodiments, the first balancing device may be an electric device comprising, for example, an electromagnet, a linear motor or a linear drive.

The above mentioned control unit can be adapted to use information received from at least one manipulator arm position sensor and/or at least one second member position sensor to continuously determine a suitable fluid pressure corresponding to a first balancing force suitable to maintain the moment balance about the second joint. The control unit ensures that the first pressure regulator adjusts the pressure in the cylinder body accordingly.

The lifting device may comprise a manipulator arm repositioning device adapted to move the manipulator arm to a rest position when an operator lets go of the tool. The rest position is preferably chosen so that the manipulator arm does not interfere with other activities when it occupies said rest position.

The manipulator arm repositioning device may comprise any suitable means adapted to apply a repositioning force to the manipulator arm, such as a pneumatic cylinder, a hydraulic cylinder or a spring. The repositioning force is advantageously applied to the first end portion of the manipulator arm.

Advantageously, the repositioning force is sufficient to move the manipulator arm to the rest position but not so large that it requires an adjustment of the first balancing force. Alternatively, the manipulator arm repositioning device may be connected to the control unit, which is adapted to activate the manipulator arm repositioning device when the operator lets go of the tool. This solution is advantageous in that the manipulator arm repositioning device is inactive when the operator uses the tool.

Alternatively, the first balancing device ensures that the manipulator arm remains in its current position when the operator lets go of the tool. This ensures that the tool is within reach of the operator when the operator decides to resume work. This solution also provides the operator with the option to place the tool in a position where it will not interfere with other activities.

The lifting device may comprise a mechanism arranged to prevent the manipulator arm from revolving about its longitudinal axis. This solution is advantageous in that is makes it easier to determine the colatitude and azimuth angle of the manipulator arm. This solution is also advantageous when the lifting device is arranged to absorb a torque generated by the tool.

The data storage means may be adapted to store information received from the control unit relating to the position of various parts of the lifting device as well as the magnitude of at least one of the first and second balancing forces.

Advantageously, the manipulator arm is elongate and has an extension in a longitudinal direction along a longitudinal axis.

Advantageously, both the first and second members of the manipulator arm are elongate and extend in the longitudinal direction of the manipulator arm. The second member of the manipulator arm is advantageously displaceable relative the first member of the manipulator arm in the longitudinal direction of the manipulator arm.

Advantageously, the tool is pivotally attached to the manipulator arm, to make it easier for the operator to use it.

The lifting device may communicate with external units and transmit data received from at least one of the manipulator arm position and second member position sensors.

The tool carried by the manipulator arm can be used to move an object from one position to another. For example, the tool on the manipulator arm can be brought into engagement with an object on a conveyor belt, after which the lifting device is used to lift the object off the conveyor belt. The object is moved to a second position and the tool disengages the object.

The gravitational moment increases when the object is carried by the lifting device. One solution to this problem is to enable the operator to manually adjust the first balancing force and/or the second balancing force to compensate for the weight of the object. Alternatively, the control unit may be adapted to automatically adjust the first balancing force and/or the second balancing force to compensate for the weight of the object. The latter solution is particularly advantageous when the weight of the object to be moved is known beforehand.

The manipulator arm or a part thereof may be allowed to rotate about its longitudinal axis. One or more additional sensors, e.g. a rotary encoder, may be provided to measure the angular position of the manipulator arm or the rotatable part thereof in relation to the longitudinal axis of the manipulator arm. The control unit or any other means may be adapted to take this parameter into account during operation of the lifting device, for example when the magnitude of a balancing force is determined or during an assembly process evaluation.

The tool may be pivotally connected to the manipulator arm. One or more additional sensors may be provided to determine the angular position of the tool in relation to the manipulator arm. The control unit or any other means may be adapted to take this parameter into account during operation of the lifting device, for example when the magnitude of a balancing force is determined or during an assembly process evaluation.

DRAWINGS

The invention will now be described with reference to the following drawings, in which like numerals are used to designate like features and in which.

DETAILED DESCRIPTION OF THE INVENTION

Figure 1:
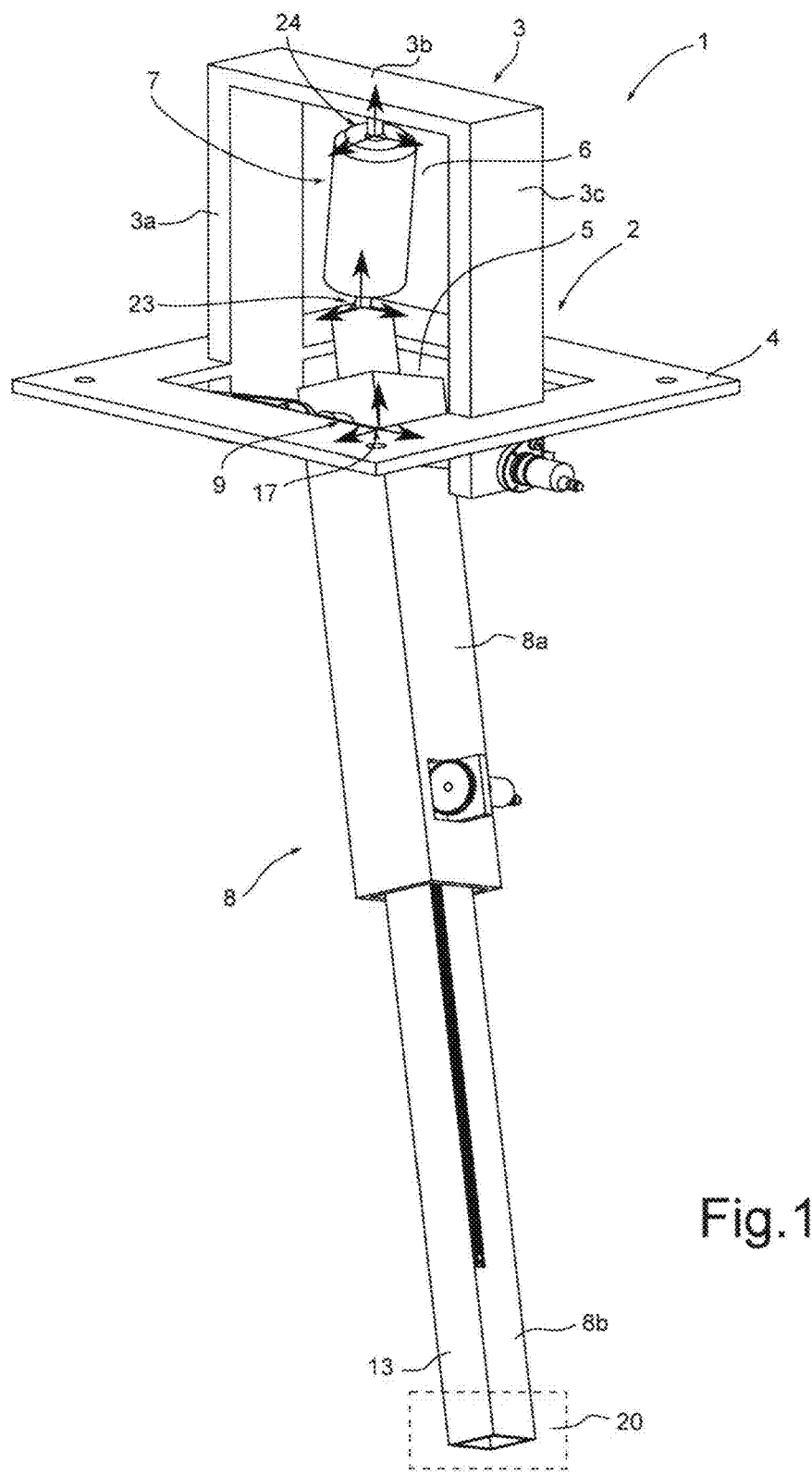
FIG. 1 shows a perspective view of a lifting device according to a first embodiment of the invention.
Figure 2:
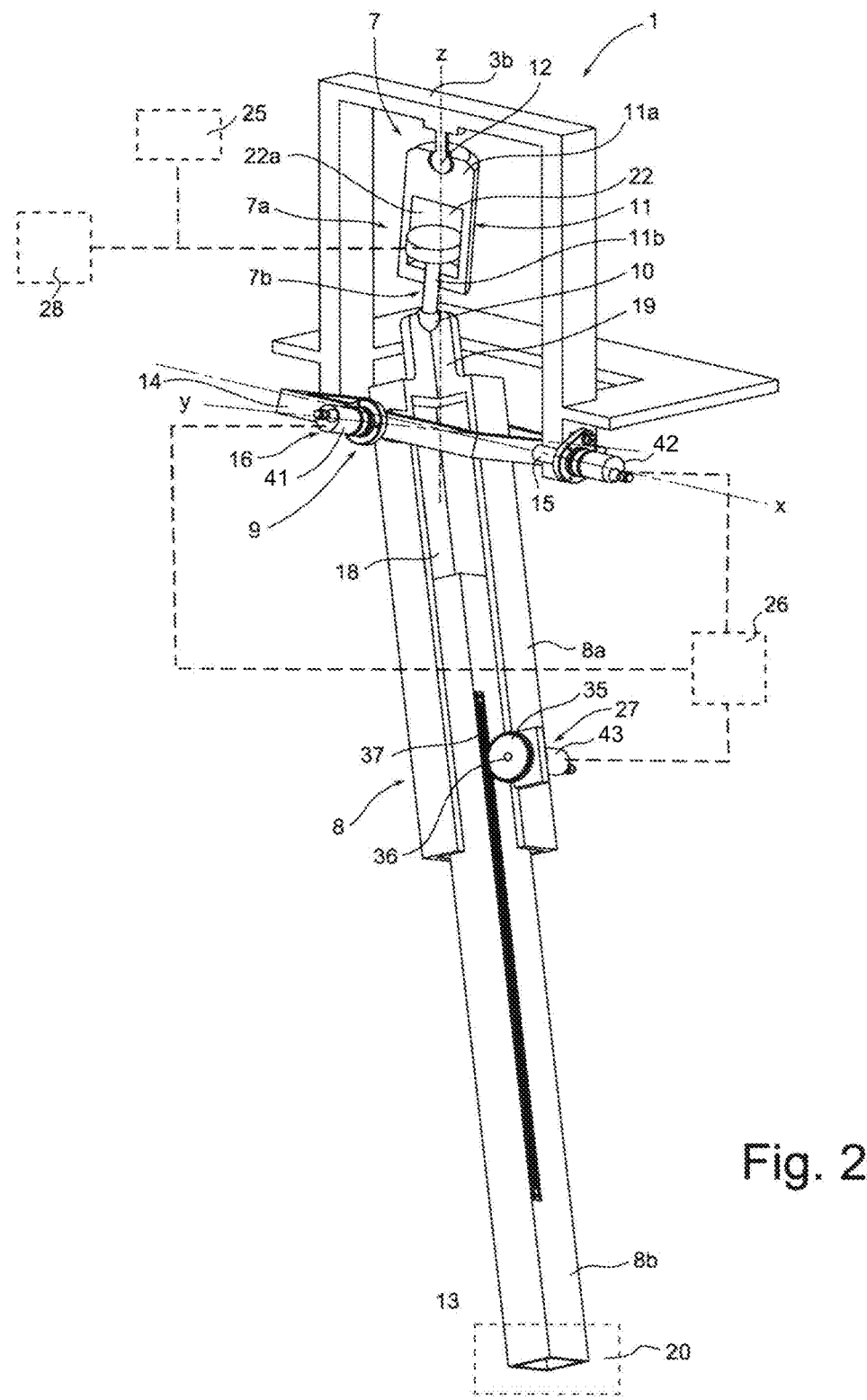
FIG. 2 shows a perspective view of the lifting device in FIG. 1, wherein some parts have been removed for the sake of clarity.

A first embodiment of the invention will now be described with reference to FIGS. 1 and 2.

The lifting device 1 comprises a framework 2. The framework 2 comprises two elongate side members 3a, 3c connected by an elongate interconnecting member 3b so as to form a U-shaped arc 3. The framework 2 further comprises a fastening part 4 for attaching the framework 2 to an external structure (not shown) located above a manual work station (not shown). The fastening part 4 is flat and has a square-shaped central through-hole 5. The side members 3a, 3c are attached to the fastening part 4 at opposite sides of the central through-hole 5, so as to define a space 6 adapted to accommodate a balancing arrangement 7.

A manipulator arm 8 extends through the through-hole 5 and into the space 6. The manipulator arm 8 comprises an elongate first member 8a and an elongate second member 8b. The first member 8a is pivotally connected to the U-shaped arc 3 by a first joint 9. The second member 8b is slidably received in a bottom hole 18 in the first member 8a, which bottom hole 18 extends in the longitudinal direction of the manipulator arm 8. Thus, the second member 8b is displaceable in the longitudinal direction of the first member 8a. Longitudinal displacement of the second member 8b can be controlled by means of a second balancing device (see FIG. 3). A tool 20 (schematically shown) suitable for use at the manual work station is attached to the second member 8b at a second end portion 13 of the manipulator arm 8.

The balancing arrangement 7 comprises a first balancing device 11 in the form of a pneumatic cylinder. A first part 7a of the balancing arrangement comprises a cylinder body 11a and a second part 7b of the balancing arrangement comprises a piston rod 11b. The piston rod 11b is slidably received in the cylinder body 11a, so that the second part 7b is displaceable relative the first part 7a. The piston rod 11b is pivotally attached to a first end portion 19 of the manipulator arm 8 by means of a second joint 10. The cylinder body 11a is pivotally attached to the interconnecting member 3b by means of a third joint 12. Both the second and third joints 10, 12 are ball joints.

The rotational centres of the first joint 9 and the third joint 12 are located on a vertical axis z and fixed in relation to one another.

The first joint 9 comprises a square-shaped outer frame 14. The outer frame 14 is pivotally mounted on a pair of pins 15 located at opposite sides of the outer frame 14. Each pin 15 connects one side of the outer frame 14 to one side member 3a, 3c of the framework 2. The pins 15 allow the outer frame 14 to be rotated about a first axis x that extends perpendicularly to the vertical axis z. A second axis y extends along a transverse axle 16 in a direction perpendicular to the first axis x. The transverse axle 16 connects two opposite sides of the outer frame 14 and is rotatable about the first axis x. The manipulator arm 8 is rotatably mounted on the transverse axle 16. Thus, the manipulator arm 8 can be rotated in any direction about the rotational centre of the first joint 9. Another way to phrase this is that the manipulator arm 8 has two rotational degrees of freedom in a first spherical coordinate system 17 with a centre point that coincides with the rotational centre of the first joint 9.

Note that the second joint 10 has two rotational degrees of freedom in a second spherical coordinate system 23 and that the third joint 12 has two rotational degrees of freedom in a third spherical coordinate system 24.

The above described arrangement allows an operator of the lifting device 1 to rotate the tool 20 about the first joint 9 as well as displace the tool 20 in the longitudinal direction of the manipulator arm 8. That is, the tool 20 can be positioned anywhere within a suitable work space.

The cylinder body 11a of the first balancing device 11 is pivotally connected to the interconnecting member 3b by the third joint 12. This piston rod 11b is at one end pivotally connected to the manipulator arm 8 by the second joint 10 and at an opposite end slidably mounted in a chamber 22 in the cylinder body 11a. The movable piston rod 11b seals off an inner part 22a of the chamber 22, so that gas transported from a gas supply 25 (schematically shown) into the inner part 22a of the chamber 22 applies a pressure on the piston rod 11b. This pressure is converted into a first balancing force acting on the first member 8a of the manipulator arm 8 via the piston rod 11b and the second joint 10.

A first pressure regulator 28 (schematically shown) is provided to regulate the gas pressure in the inner part 22a of the chamber 22. In this embodiment, the first pressure regulator 28 is adapted to maintain a constant gas pressure in the inner part 22a of the chamber 22 regardless of the position of the piston rod 11b. Such pressure regulators are well known to the skilled person and will not be elaborated further in this specification. The constant gas pressure results in a constant first balancing force applied to the manipulator arm 8. The gas pressure is chosen so that the balancing moment (see below) balances the gravitational moment generated by the gravitational force acting on the manipulator arm 8.

The magnitude of the gravitational moment acting to rotate the manipulator arm 8 about the first joint 9 depends on the angular position of the manipulator arm 8. Due to the fact that the first joint 9 and the third joint 12 are located on the same vertical axis z, the manipulator arm 8 may assume a vertical position. The gravitational moment is zero when the manipulator arm 8 assumes this vertical position, because the lever arm of the gravitational force acting on the manipulator arm 8 is zero.

The gravitational moment is balanced by a balancing moment acting to rotate the manipulator arm 8 in the opposite direction. The balancing moment is generated by an opposing force acting on the first end portion 19 of the manipulator arm 8. In this embodiment, the opposing force is the first balancing force. The arrangement of the first joint 9 and the third joint 12 on the same vertical axis z ensures that the first balancing force is applied in a vertical direction when the manipulator arm assumes a vertical position. Thus, the lever arm of the opposing force is zero when the manipulator arm 8 assumes a vertical position, and thus, the balancing moment is zero when the manipulator arm 8 assumes a vertical position.

Rotation of the manipulator arm 8 about the first joint 9 in a direction away from the vertical position increases both the lever arm of the gravitational force and the lever arm of the opposing force, so that the balancing moment and the gravitational moment increases with about the same magnitude. Thus, a moment balance with respect to the gravitational moment is maintained about the first joint 9.

Note that the balancing moment does not prevent rotation of the manipulator arm 8. The balancing moment counter-acts the gravitational moment only, and thus reduces the effort required by the operator to rotate the manipulator arm 8 about the first joint 9. The balancing moment also ensures that the manipulator arm 8 remains in its current position when the operator no longer attempts to rotate it.

Note that the opposing force may be applied at an angle to the vertical axis z when the manipulator arm 8 is rotated about the first joint 9. This means that the balancing moment may not increase with the exact same amount as the moment generated by the gravitational force. However, friction between various parts of the lifting device 1 ensures that the difference does not affect the moment balance about the first joint, at least as long as the manipulator arm remains within an angle of 22°, or advantageously within an angle of 45°, with respect to the vertical axis z.

Note that the magnitude of the gravitational moment also depends on the extension of the manipulator arm 8 and therefore, in some embodiments, it may be advantageous to continuously adjust the size of the balancing force.

The lifting device 1 also comprises a data storage means 26 (schematically shown) and first, second and third sensors 41, 42, 43, adapted to continuously register one or more parameters indicative of the angular position of the manipulator arm 8 and the position of the second member 8b with respect to the first member 8a. These parameter values are stored in the data storage means 26, so that they can be retrieved during a subsequent evaluation process. This information can, for example, be used to recreate and evaluate the assembly process.

The first sensor 41, in this embodiment an angular position sensor, is located at the transverse axle 16 on which the manipulator arm 8 is rotatably mounted. The second sensor 42, in this embodiment an angular position sensor, is located at one of the pins 15 on which the outer frame 14 is rotatably mounted. Information gathered from the first and second sensors 41, 42 can be used to determine the angular position of the manipulator arm 8.

The manipulator arm 8 comprises a sensor unit 27 adapted to register the longitudinal displacement of the second member 8b with respect to the first member 8a. The sensor unit 27 comprises a toothed wheel 35 fixedly attached to a shaft 36. The toothed wheel 35 extends through a slit in the first member 8a, which allows the toothed wheel 35 to interact with a toothed track 37 running along the second member 8b. A rotary encoder 33 measures the angular displacement of the shaft 36 and this information in combination with the known diameter of the toothed wheel 35 is used to determine the position of the second member 8b with respect to the first member 8a.

Figure 3:
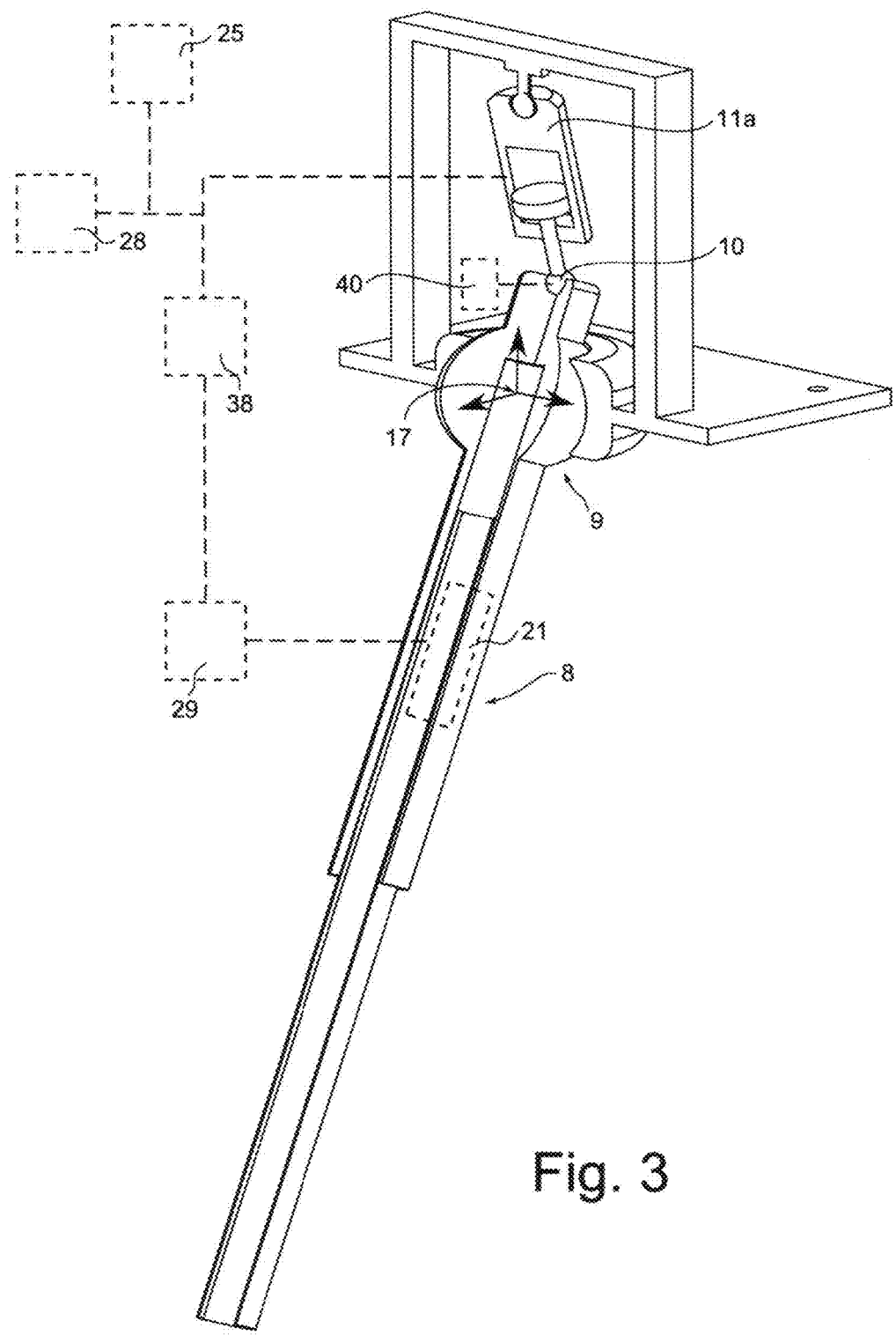
FIG. 3 shows a perspective view of a lifting device according to a second embodiment of the invention, wherein some parts have been removed for the sake of clarity.

FIG. 3 shows a second embodiment of the invention. The second embodiment is similar to the first embodiment. However, in the second embodiment, the first joint 9 is a ball joint. Two angular position sensors (not shown) are provided at the first joint 9 to determine the colatitude and azimuth angle of the manipulator arm 8 in the first spherical coordinate system 17. In alternative embodiments, the sensors may be located elsewhere on the manipulator arm 8.

A manipulator arm repositioning device 40 (schematically shown) is arranged to act on the second joint 10. The manipulator arm repositioning device 40 may comprise a pneumatic cylinder adapted to apply a force to the second joint 10 to move the manipulator arm 8 to a predetermined rest position. Advantageously, the force applied by the manipulator arm repositioning device 40 is sufficient to move the manipulator arm 8 to the rest position but not so large that it requires an adjustment of the first balancing force.

In an alternative embodiment, the manipulator arm repositioning device 40 can be connected to the control unit 38 (see below), in which case the control unit 38 can be adapted to activate the manipulator arm repositioning device 40 when the operator lets go of the tool 20.

The first pressure regulator 28 is connected to a control unit 38 (schematically shown), which in turn is connected to the first, second and third sensors (not shown in FIG. 3). Information relating to the angular position of the manipulator arm 8 and the extension of the manipulator arm 8 is sent to the control unit 38 and the control unit 38 uses this information to determine a suitable fluid pressure for the first balancing device 11. This information is sent to the first pressure regulator 28, which adjusts the fluid pressure in the cylinder body 11a accordingly. Thus, it is ensured that the first balancing force is optimized to maintain a moment balance about the first joint 9.

A second balancing device 21 (schematically shown) is located within the first member 8a. In this embodiment, the second balancing device 21 is a single-acting cylinder arranged to exert a second balancing force on the second member 8b in the longitudinal direction of the first member towards the first joint 9. The fluid pressure within the single-acting cylinder is controlled by means of a second pressure regulator 29 (schematically shown), which in turn is connected to the control unit 38. The control unit 38 is adapted to control the second pressure regulator 29 to ensure that the balancing force applied to the second member 8b balances the gravitational force, regardless of the angular position of the manipulator arm 8.

Figure 4:
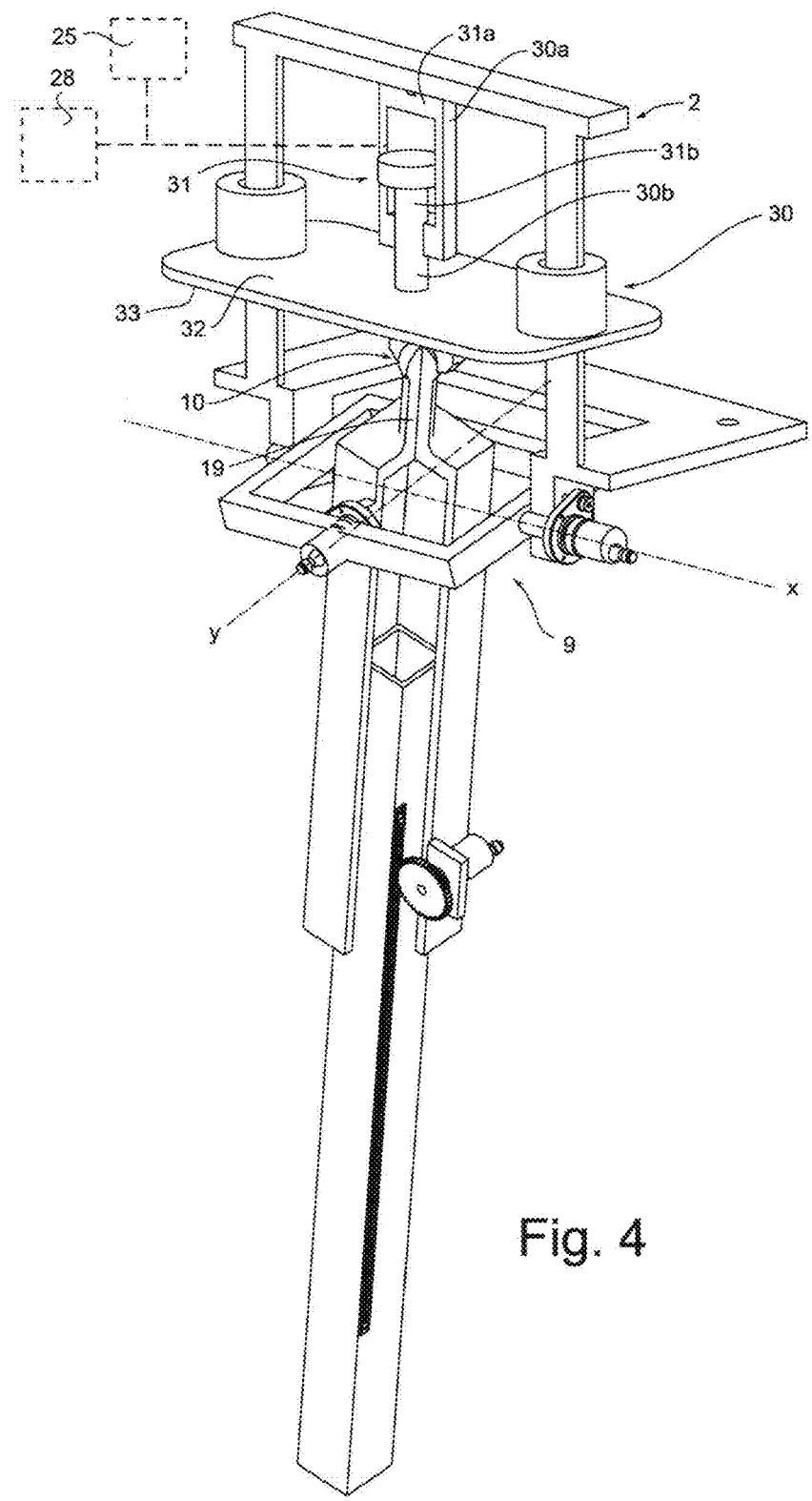
FIG. 4 shows a perspective view of a lifting device according to a third embodiment of the invention, wherein some parts have been removed for the sake of clarity.

FIG. 4 shows a third embodiment of the lifting device 1. The manipulator arm 8 is similar to the manipulator arm in FIGS. 1 and 2, whereas the balancing arrangement 30 has a different design. In this embodiment, the balancing arrangement 30 comprises a first balancing device 31 in the form of a pneumatic cylinder. The balancing arrangement 30 comprises a first part 30a comprising a cylinder body 31a and a second part 30b comprising a piston rod 31b slidably mounted in said cylinder body 31a. The cylinder body 31a is fixedly attached to the framework 2 and extends in a vertical direction. The piston rod 31b has a first end segment located within the cylinder body 31a and an opposite second end segment located outside the cylinder body 31a. The second end segment has the shape of a disc 32 and the disc 32 has a surface 33 facing the first end portion 19 of the manipulator arm 8. The surface 33 interacts with the first end portion 19, so that the first balancing force (in this embodiment the opposing force) generated by the first balancing device 31 is applied to the first end portion 19 of the manipulator arm 8. The first end portion 19 and the surface 33 interacts via a second joint 10 that is movable across the surface 33. The first balancing force is generated by means of a first pressure regulator 28 that ensures that the fluid pressure in the cylinder body 31a, which fluid pressure acts on the piston rod 31b, remains constant during use of the lifting device 1. The disc 32 has an extension in a horizontal plane when the lifting device 1 is in use, so that the first end portion 19 of the manipulator arm 8 maintains interaction with the surface 33 of the disc 32 also when the manipulator arm 8 is rotated about the first joint 9, or at least as longs as the manipulator arm 8 remains within an angle of 22°, or advantageously within an angle of 45°, with respect to a vertical axis extending through the first joint. In this embodiment, the first balancing force is always applied in a vertical direction.

In an alternative embodiment, the first balancing device 31 may be part of the manipulator arm, so that the first balancing force is applied by means of the first end portion 19 of the manipulator arm 8 to the surface 33 of the disc 32. This gives rise to a reaction force acting on the first end portion 19 of the manipulator arm 8 and this reaction force balances the gravitational force. In this embodiment, the reaction force is the opposing force.

The first balancing device 31 may be controlled in the same way as described with reference to any of FIGS. 1-3.

Figure 5:
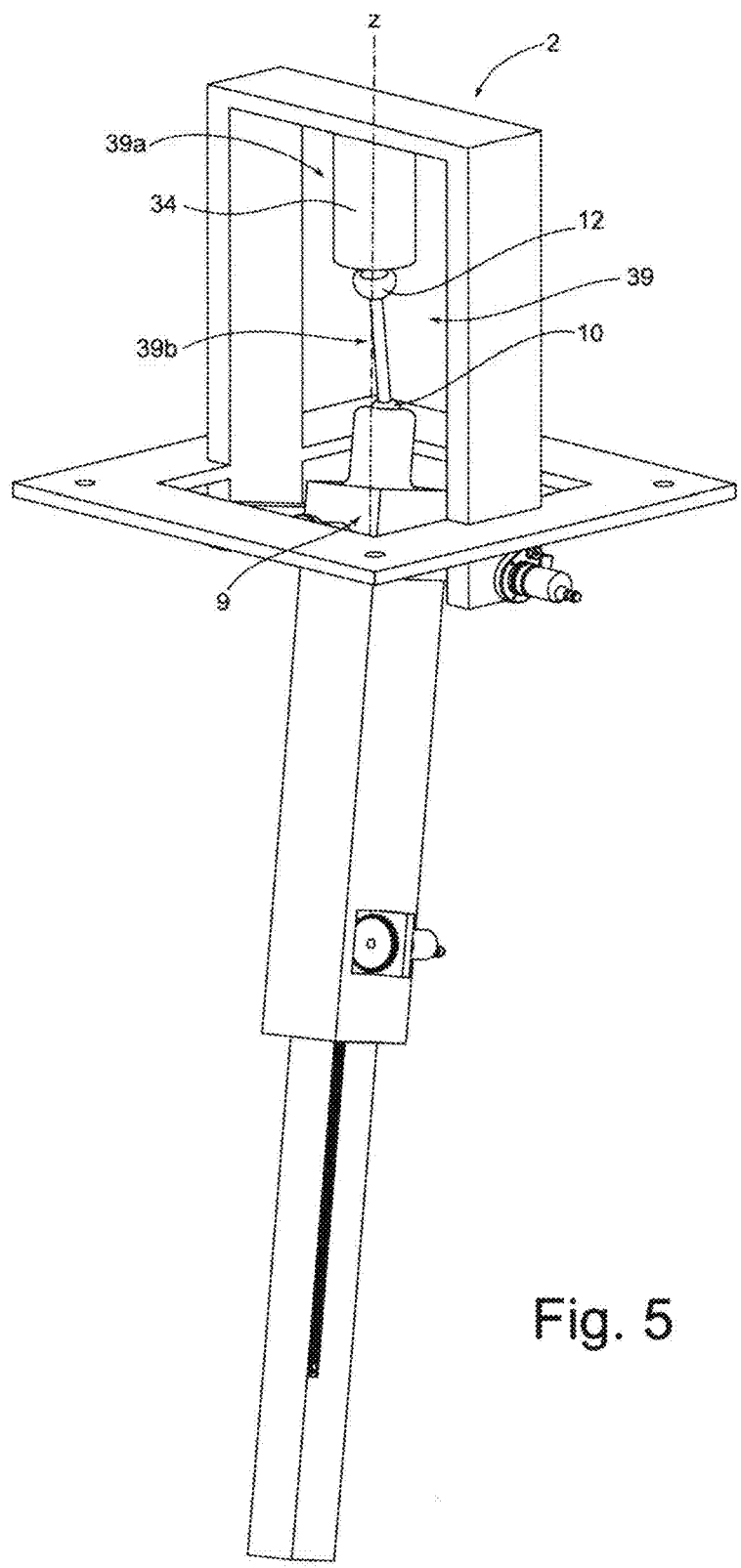
FIG. 5 shows a perspective view of a lifting device according to a fourth embodiment of the invention.

FIG. 5 shows a fourth embodiment of the invention. The fourth embodiment is similar to the first and second embodiments in that it comprises a first, a second and a third joint 9, 10, 12. However, in this embodiment, the third joint 12 is displaceable in relation to the framework 2 along the vertical axis z, which vertical axis z extends through the rotational centre of the first joint 9. This is achieved by arranging the first balancing device 34 in the form of a pneumatic cylinder between the third joint 12 and the framework 2. In this embodiment, the first part 39a of the balancing arrangement 39 comprises the first balancing device 34 whereas the second part 39b of the balancing arrangement 39, which second part 39b has a constant length, extends between the second joint 10 and the third joint 12. The third joint 12 also has two rotational degrees of freedom in the third spherical coordinate system 24.

The first balancing device 34 may be controlled in the same way as described with reference to any of FIGS. 1-3.

The scope of protection provided by the following claims is not limited to the above described embodiments and the skilled person understands that these embodiments can be combined and altered in many different ways. For example, the first joint may be any type of suitable joint, the manipulator arm may comprise intermediate members located between the first and second members, and the lifting device in FIG. 1 can be provided with a manipulator arm repositioning device as the one shown in FIG. 3. Also, the lifting device in FIG. 1 may comprise a control unit as the one shown in FIG. 3, which control unit is adapted to communicate with the first, second and third sensors and to continuously adjust the pressure in the pneumatic cylinder in response to data continuously received from the first, second and third sensors.

The invention claimed is:

1. A lifting device (1) for use at a manual work station, the lifting device (1) comprising:
   a framework (2);
   an elongate manipulator arm (8) pivotally connected to the framework (2) by a first joint (9), which elongate manipulator arm (8) comprises a first end portion (19) and a second end portion (13) located on opposite sides of the first joint (9) as seen in the longitudinal direction of the manipulator arm (8), wherein the second end portion (13) is adapted to carry at least one tool (20);
   a balancing arrangement (7; 30, 39) comprising a first part (7a; 30a; 39a) connected to the framework (2), so that said framework (2) connects the first part (7a; 30; 39a) of the balancing arrangement (7; 30, 39) and the first joint (9), and a second part (7b; 30b; 39b) connected to the first end portion (19) of the manipulator arm (8),
   wherein the balancing arrangement (7; 30; 39) comprises a first balancing device (11; 31; 34), which first balancing device (11; 31; 34) is extendable to ensure that the interaction between the second part (7b; 30b; 39b) of the balancing arrangement (7; 30; 39) and the first end portion (19) of the manipulator arm (8) is maintained when the manipulator arm (8) is rotated about the first joint (9), and which first balancing device (11; 31; 34) is adapted to generate a first balancing force which, through the interaction between the first end portion (19) of the manipulator arm (8) and the second part (7b; 30b; 39b) of the balancing arrangement (7; 30; 39), maintains a moment balance about the first joint (9) with respect to the gravitational force acting on the manipulator arm (8) so that the gravitational force is counteracted by the balancing arrangement that acts to rotate the manipulator arm about the first joint in the opposite direction, and
   wherein the first joint (9) provides the manipulator arm (8) with at least two rotational degrees of freedom relative to the framework (2) at the first joint (9) in a first spherical coordinate system (17) which has a center point that coincides with the rotational center of the first joint (9).

2. Lifting device (1) according to claim 1, further comprising at least one manipulator arm position sensor (41; 42) adapted to continuously measure at least one manipulator arm position parameter indicative of the angular position of the manipulator arm (8) at the first joint (9).

3. Lifting device (1) according to claim 1, wherein the manipulator arm (8) comprises a first member (8a) comprising the first end portion (19) and a second member (8b) comprising the second end portion (13), wherein the second member (8b) is displaceable relative the first member (8a) in the longitudinal direction of the manipulator arm (8).

4. Lifting device (1) according to claim 3, further comprising at least one second member position sensor (43) adapted to continuously measure at least one second member position parameter indicative of the position of the second member (8b) with respect to the first member (8a).

5. Lifting device (1) according to claim 2, further comprising a data storage means (26) adapted to store parameter data received from at least one of the manipulator arm position and second member position sensors (41, 42, 43).

6. Lifting device (1) according to claim 2, further comprising a control unit (38) adapted to control the first balancing device (11; 31; 34), which control unit (38) is adapted to adjust the magnitude of the first balancing force in response to parameter data received from at least one of the manipulator arm position and second member position sensors (41, 42, 43).

7. Lifting device (1) according to claim 1, wherein the first balancing device (11; 31; 34) is adapted to provide a constant first balancing force.

8. Lifting device (1) according to claim 1, wherein the first balancing device (11; 31; 34) comprises a cylinder body (11a; 31a) and a piston rod (11b; 31b) slidably mounted in the cylinder body (11a; 31a), wherein the first balancing device (11; 31; 34) further comprises at least one first pressure regulator (28) adapted to control the pressure in a fluid located within the cylinder body (11a; 31a) and acting on the piston rod (11b; 31b) to generate the first balancing force.

9. Lifting device (1) according to claim 1, wherein the second part (7b; 39b) of the balancing arrangement (7; 39) is pivotally connected to the first end portion (19) of the manipulator arm (8) by a second joint (10) and pivotally connected to the framework (2) by a third joint (12).

10. Lifting device (1) according to claim 9, wherein the third joint (12) connects the framework (2) and the first part (7a) of the balancing arrangement (7).

11. Lifting device (1) according to claim 1, wherein the first balancing device (1) is arranged so that the first balancing force is applied along a vertical axis (z) extending through the first joint (9) when the gravitational moment is zero.

12. Lifting device (1) according to claim 3, further comprising a data storage means (26) adapted to store parameter data received from at least one of the manipulator arm position and second member position sensors (41, 42, 43).

13. Lifting device (1) according to claim 3, further comprising a control unit (38) adapted to control the first balancing device (11; 31; 34), which control unit (38) is adapted to adjust the magnitude of the first balancing force in response to parameter data received from at least one of the manipulator arm position and second member position sensors (41, 42, 43).

14. Lifting device (1) according to claim 4, further comprising a control unit (38) adapted to control the first balancing device (11; 31; 34), which control unit (38) is adapted to adjust the magnitude of the first balancing force in response to parameter data received from at least one of the manipulator arm position and second member position sensors (41, 42, 43).

15. Lifting device (1) according to claim 5, further comprising a control unit (38) adapted to control the first balancing device (11; 31; 34), which control unit (38) is adapted to adjust the magnitude of the first balancing force in response to parameter data received from at least one of the manipulator arm position and second member position sensors (41, 42, 43).

16. Lifting device (1) according to claim 2, wherein the first balancing device (11; 31; 34) is adapted to provide a constant first balancing force.

17. Lifting device (1) according to claim 14, wherein,
the framework (2) comprises a first part (4) with a central through-hole (5), and an arc (3) comprised of an elongate interconnecting member (3b) connected to elongate side members (3a, 3c), the side members (3a, 3c) being attached to the first part (4) at opposite sides of the central through-hole (5) so as to define a space (6) therebetween,
the first joint (9) is connected to the framework (2),
the first end portion (19) extends through the through-hole (5) and into the space (6) defined between the side members (3a, 3c), the first end portion (19) pivotally connected to the arc (3) by the first joint (9), and
the balancing arrangement (7; 30, 39) is accommodated in the space (6) defined between the side members (3a, 3c), the first part (7a; 30a; 39a) being connected to the interconnecting member (3b) so that said framework (2) connects the first part (7a; 30; 39a) of the balancing arrangement (7; 30, 39) and the first joint (9).

18. Lifting device (1) according to claim 1, wherein, the first joint (9) is connected to the side members (3a, 3c) of the framework (2).

* * * * *